(12) United States Patent
Fukushige

(10) Patent No.: US 7,876,063 B2
(45) Date of Patent: Jan. 25, 2011

(54) AXIAL GAP TYPE MOTOR/GENERATOR

(75) Inventor: Takashi Fukushige, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 334 days.

(21) Appl. No.: 12/135,789

(22) Filed: Jun. 9, 2008

(65) Prior Publication Data

US 2008/0315818 A1    Dec. 25, 2008

(30) Foreign Application Priority Data

Jun. 21, 2007    (JP) .............................. 2007-164089

(51) Int. Cl.
*H02P 1/30* (2006.01)
*G05B 11/01* (2006.01)

(52) U.S. Cl. .................. 318/629; 318/503; 318/12; 318/148; 318/460; 318/800; 318/400.23; 318/827; 310/51; 310/254.1

(58) Field of Classification Search .............. 310/51, 310/254.1; 318/114, 503, 12, 148, 400.238, 318/460, 827, 400.23, 800, 629, 807, 290
See application file for complete search history.

(56) References Cited

U.S. PATENT DOCUMENTS

| | | | | |
|---|---|---|---|---|
| 4,047,083 A | * | 9/1977 | Plunkett ..................... | 318/807 |
| 4,651,068 A | * | 3/1987 | Meshkat-Razavi ..... | 318/400.02 |
| 4,951,187 A | * | 8/1990 | Stemmler .................... | 363/96 |
| 5,272,429 A | * | 12/1993 | Lipo et al. .................. | 318/808 |
| 5,321,599 A | * | 6/1994 | Tanamachi et al. ............ | 363/41 |
| 5,432,390 A | * | 7/1995 | Obradovic ........... | 310/216.116 |
| 5,471,104 A | * | 11/1995 | Toshimitsu et al. ........... | 310/90 |
| 5,510,689 A | * | 4/1996 | Lipo et al. .................. | 318/809 |
| 5,661,390 A | * | 8/1997 | Lipo et al. .................. | 318/803 |
| 6,087,755 A | * | 7/2000 | Suzuki et al. ......... | 310/216.091 |
| 6,737,778 B2 | * | 5/2004 | Daikoku et al. ............. | 310/112 |
| 7,049,783 B2 | * | 5/2006 | Yoshinaga et al. .......... | 318/629 |
| 7,151,354 B2 | * | 12/2006 | Yoshinaga et al. .......... | 318/611 |
| 7,170,247 B2 | * | 1/2007 | Yoshinaga et al. .......... | 318/448 |
| 7,176,652 B2 | * | 2/2007 | Wakabayashi et al. . | 318/400.02 |

FOREIGN PATENT DOCUMENTS

JP    2005-304237    10/2005

* cited by examiner

*Primary Examiner*—Rita Leykin
(74) *Attorney, Agent, or Firm*—Global IP Counselors, LLP

(57) ABSTRACT

An axial gap type motor/generator is provided with a stator, a rotor and an alternating current control device. The alternating current control device executes alternating current control of a single phase or multiple phase alternating current flowing in the coils. The alternating current control device includes a superpositioning control section and a frequency component control section. The superpositioning control section produces the alternating current by superpositioning a plurality of frequency components including a first order fundamental wave component and a plurality of higher harmonic wave components that have frequencies equal to integer multiples of a frequency of the fundamental wave components and are of orders that are equal to values of the integer multiples. The frequency component control section controls a relationship among the frequency components such that two pairs of the frequency components whose orders differ by two are aligned with respect to each other.

24 Claims, 11 Drawing Sheets

AXIAL GAP TYPE MOTOR/GENERATOR

CROSS-REFERENCE TO RELATED APPLICATIONS

This application claims priority to Japanese Patent Application No. 2007-164089, filed on Jun. 21, 2007. The entire disclosure of Japanese Patent Application No. 2007-164089 is hereby incorporated herein by reference.

BACKGROUND OF THE INVENTION

1. Field of the Invention

The present invention generally relates to a control for an axial gap type motor/generator having a stator and a rotor arranged to face across from each other along an axial direction. More specifically, the present invention relates to a control configured to prevent or reduce a planar mode of vibration of the rotor in which the rotor deforms in an axial direction.

2. Background Information

The alternating current (AC) motor/generators used as power sources in electric automobiles, hybrid automobiles, and fuel cell automobiles are designed for large outputs. The magnetic noise emitted from this kind of large output AC motor/generator can be a problem. Since the rotational speeds at which such an AC motor/generator is used range widely from a low rotational speed region to a high rotational speed region, rotor vibration occurring when the rotor of the AC motor/generator rotates can also be a problem. There are known technologies for alleviating these problems. One example of such a technology is disclosed in Japanese Laid-Open Patent Publication No. 2005-304237.

The technology disclosed in Japanese Laid-Open Patent Publication No. 2005-304237 increases or decreases a magnetic noise of a multiple phase AC motor/generator by super-positioning different components of a multiple phase alternating current flowing in an armature coil of the motor/generator. More specifically, the different components include a fundamental frequency component and a higher harmonic wave component. The fundamental frequency component is assumed to be a first order frequency component; the higher harmonic wave component has the opposite phase sequence as the fundamental frequency component and is of an order given by n−1 (n is an integer). An nth order magnetic noise is increased or decreased by superpositioning the (n−1)th order higher harmonic wave component over the multiple phase AC current. By using the technology disclosed in Japanese Laid-Open Patent Publication No. 2005-304237, an nth order higher harmonic wave component of a radial magnetic excitation force occurring in the AC motor/generator can be damped. In the technology disclosed in Japanese Laid-Open Patent Publication No. 2005-304237 is applied to a radial gap type motor/generator.

In view of the above, it will be apparent to those skilled in the art from this disclosure that there exists a need for an improved alternating current control apparatus for an axial gap type motor/generator. This invention addresses this need in the art as well as other needs, which will become apparent to those skilled in the art from this disclosure.

SUMMARY OF THE INVENTION

In recent years, in order to obtain a motor with a higher torque, research has been conducted to increase the number of poles in an axial gap type motor generator having a rotor and a stator that are arranged to face each other along an axial direction. More specifically, in such an axial motor/generator, a rotor has a small dimension along the direction of the center axis thereof and a large dimension in a radial direction. A large number of permanent magnets are arranged along a circumferential direction of the rotor such that the rotor has a large number of poles.

Another arrangement is a two-rotor, one-stator motor/generator in which two circular disk-shaped rotor parts are mounted on a common shaft with a stator arranged between the two rotor parts. In such an axial gap motor/generator, vibrations can cause a problem in a planar mode of vibration in which the rotor parts undergoes deformation along the axial directions. The rotor parts are deformed due to a low-order planar mode of deformation. As the order of the planar vibration becomes higher, the number of bent locations becomes larger. More specifically, the first to fourth orders of planar mode vibration are typically a problem.

If the technology disclosed in Japanese Laid-Open Patent Publication No. 2005-304237 is applied to an axial gap type motor/generator with a large number of poles, then certain problems occur which will now be explained. When the order number n is high due to the large number of poles of the rotor, it is necessary to produce a higher harmonic wave component of the (n−1)th order in order to apply the technology disclosed in Japanese Laid-Open Patent Publication No. 2005-304237. Since it is difficult to control higher order harmonics, the (n−1)th order harmonic has a higher frequency than can be controlled and the degree to which the technology can actually be applied to a motor having a large number of poles is greatly limited. Consequently, the technology cannot solve the problem of planar mode vibration that is peculiar to axial gap motors.

The only order of planar mode vibration against which the technology of disclosed in Japanese Laid-Open Patent Publication No. 2005-304237 is effective is the 0th order planar vibration in which the rotor deforms in a bowl-shaped manner. Since the vibrations that cause problems in an axial gap type motor/generator are in the first to fourth order planar modes of vibrations, the technology of Japanese Laid-Open Patent Publication No. 2005-304237 cannot solve the problem of planar mode of vibration that is peculiar to axial gap motors.

As a result, it has been discovered that an effect of eliminating or appropriately reducing the planar modes of vibration described above can be obtained by sending to the coil of a synchronous motor/generator an alternating current that has two superpositioned pairs of frequency components whose orders differ by 2 (i.e., the orders of the frequency components of each pair differ by 2). Thus, one object of the present invention is to provide a technology that can effectively prevent planar mode vibration in an axial gap type motor/generator.

In order to achieve the object, an axial gap type motor/generator is provided that basically comprises a stator, a rotor and an alternating current control device. The stator includes a plurality of stator iron cores with a coil disposed on each of the stator iron cores. The rotor faces the stator, with the rotor includes a plurality of magnetic poles. The alternating current control device is configured to execute alternating current control of a single phase or multiple phase alternating current flowing in the coils. The alternating current control device includes a superpositioning control section and a frequency component control section. The superpositioning control section is configured to produce the alternating current by super-positioning a plurality of frequency components including a first order fundamental wave component and a plurality of higher harmonic wave components that have frequencies equal to integer multiples of a frequency of the fundamental wave components and are of orders that are equal to values of the integer multiples. The frequency component control section is configured to control a relationship among the frequency components such that two pairs of the frequency components whose orders differ by two are aligned with respect to each other.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
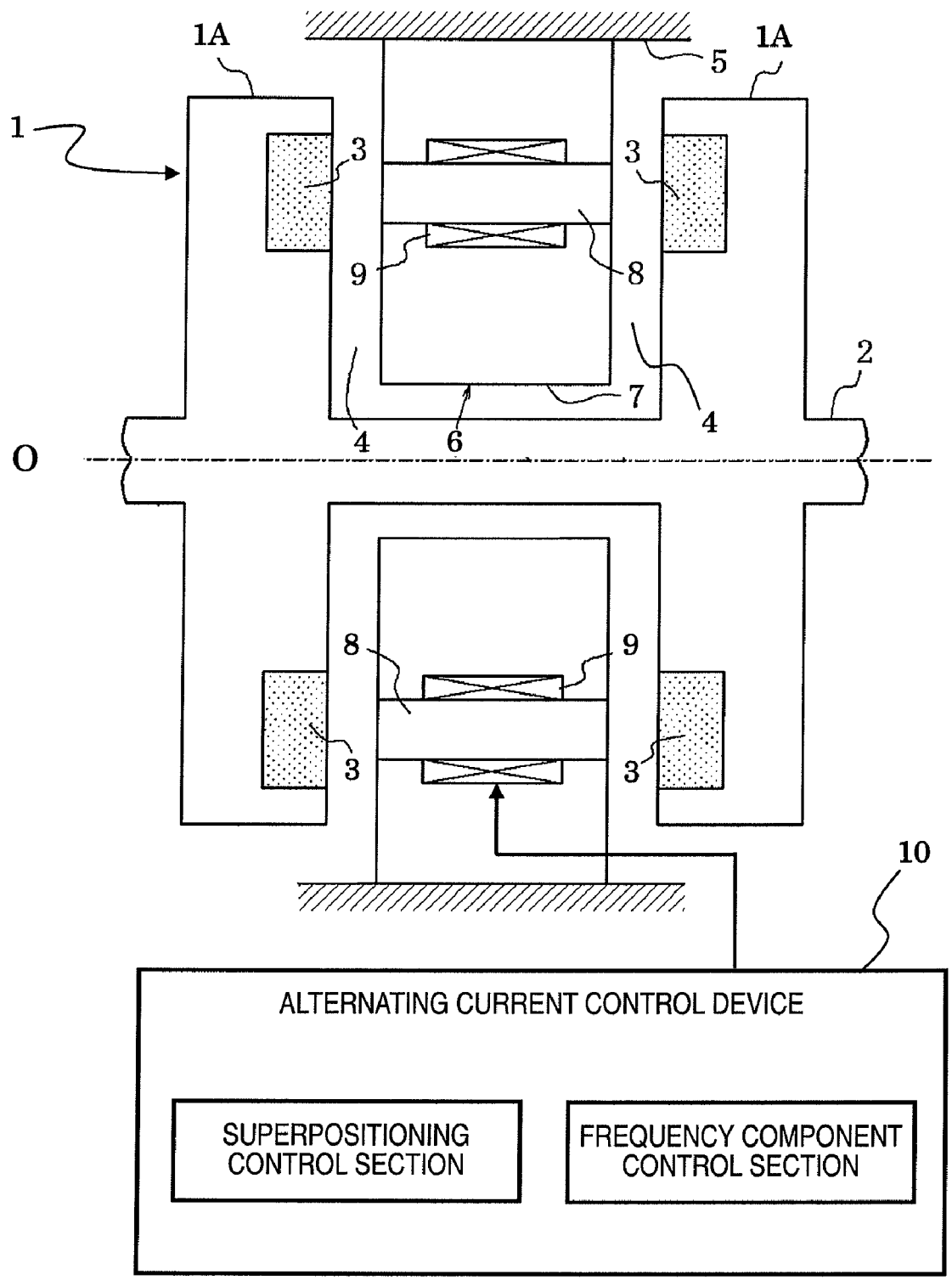
FIG. 1 is a simplified vertical cross sectional view of an axial gap type motor/generator equipped with an alternating current control device in accordance with one embodiment.
Figure 2:
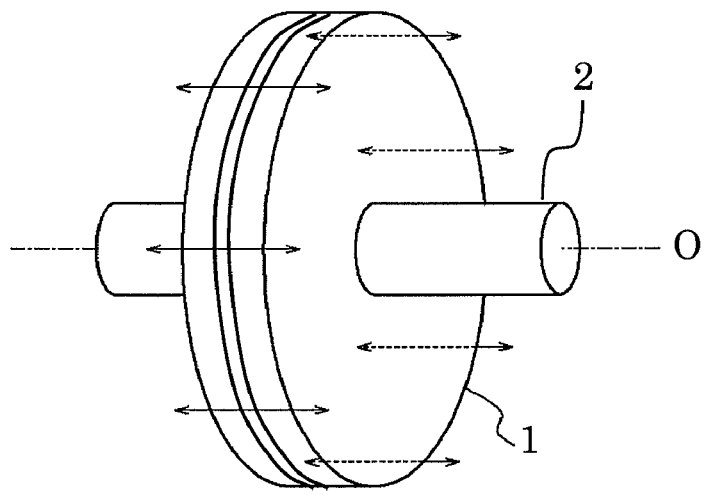
FIG. 2 is a perspective view of the rotor of the axial gap type motor/generator illustrated in FIG. 1.

Referring initially to FIG. 1, a simplified vertical cross sectional view of a two-rotor one-stator axial gap type motor/generator is illustrated that is equipped with an alternating current control apparatus in accordance with one illustrated embodiment. FIG. 2 is perspective view of a rotor of the axial gap type motor/generator illustrated in FIG. 1. The center plane of the cross section of the axial gap type motor/generator includes a center rotational axis O. The motor/generator basically has a rotor 1, a rotor shaft 2, a motor case 5 and a stator 6. The rotor 1 includes a pair of circular disk-shaped rotor parts 1A. The rotor parts 1A are fixedly connected to a rotor shaft 2 such that the rotor parts 1A cannot rotate relative to the rotor shaft 2. The rotor shaft 2 is arranged to extend along the center rotational axis O, which is indicated with a single-dot chain line. The shaft 2 is rotatably supported to the motor case 5. The rotor parts 1A have inner surfaces that face toward the stator 6 across air (axial) gaps 4 that exist axially between the rotor parts 1A and the stator 6. The stator 6 is fixed to the motor case 5. The stator 6 has an annular shape with a hole 7 in a middle portion thereof. The rotor shaft 2 passes through the hole 7 such that the rotor parts 1A are arranged on both sides of the stator 6 along the direction of the center rotational axis O.

The stator 6 is provided with a plurality of stator iron cores 8 that are arranged along a circumferential direction such that each of the stator iron cores 8 extends in a direction parallel to the center rotational axis O. A coil 9 is wound onto each of the stator iron cores 8. Permanent magnets 3 are arranged circumferentially in the inner surfaces of the rotor parts 1A in such positions that they face across from the ends of the iron cores 8 of the stator 6.

Although not shown in the figures, it is possible to provide a plurality of slots arranged along a circumferential direction in the stator 6 with the stator iron cores 8 arranged between adjacent slots. Alternately, if the axial gap motor/generator is of the one-rotor one-stator type, then teeth can be arranged circumferential on the stator and the teeth can be configured to serve as stator iron cores. Thus, regardless of whether the stator iron cores 8 are thought of as comprising portions lying between slots or as comprising teeth depending on the type and shape of the stator 6, the number of stator iron cores 8 will be equal to the number of slots, which expresses the specification of the stator of the motor/generator.

An alternating current control device 10 is operatively connected to the coils 9 for controlling the alternating current flowing in the coils 9. In particular, as discussed below in more detail, the alternating current control device 10 is configured to execute alternating current control of a single phase or multiple phase alternating current flowing in the coils 9. The alternating current control device 10 includes a superpositioning control section and a frequency component control section that cooperate to control the alternating current flowing in the coils 9. The alternating current control device 10 preferably includes a microcomputer with an alternating current control program (the superpositioning control section and the frequency component control section) that controls the current flowing in the coils 9. Basically, the superpositioning control section is configured to produce the alternating current by superpositioning a plurality of frequency components including a first order fundamental wave component and a plurality of higher harmonic wave components that have frequencies equal to integer multiples of a frequency of the fundamental wave components and are of orders that are equal to values of the integer multiples. The frequency component control section is configured to control a relationship among the frequency components such that two pairs of the frequency components whose orders differ by two are aligned with respect to each other.

With the alternating current control device 10, the planar mode of vibration described above can be reduced to an appropriate degree by stipulating a relationship among the superpositioned frequency components of current flowing in the stator coils 9 such that two pairs of frequency components whose orders differ by 2 are aligned with each other. Also the alternating current control device 10, even if there are high orders of planar order vibration, the orders of the higher harmonic wave components can be reduced, making it easier to control the higher harmonic wave components. As a result, planar mode vibrations can be eliminated or effectively reduced even in axial gap type motor generators having larger numbers of poles.

The axial gap type motor/generator shown in FIG. 1 can be either a single phase motor/generator or a multiple phase motor/generator having three or more phases. When current flows through the coils 9, a magnetic flux is generated that passes through the stator iron cores 8 and the magnetic flux passes across the axial gaps 4 to form a magnetic circuit with the permanent magnets 3 of the rotor parts 1A arranged on both sides of the stator 6. The rotor parts 1A are rotated by controlling the frequency components of the alternating current flowing in the coils 9 (or the alternating voltage). The current in the coils 9 comprises a plurality of superpositioned frequency components. The frequency components include a fundament component of the sine wave and higher harmonic wave components.

Figure 3:
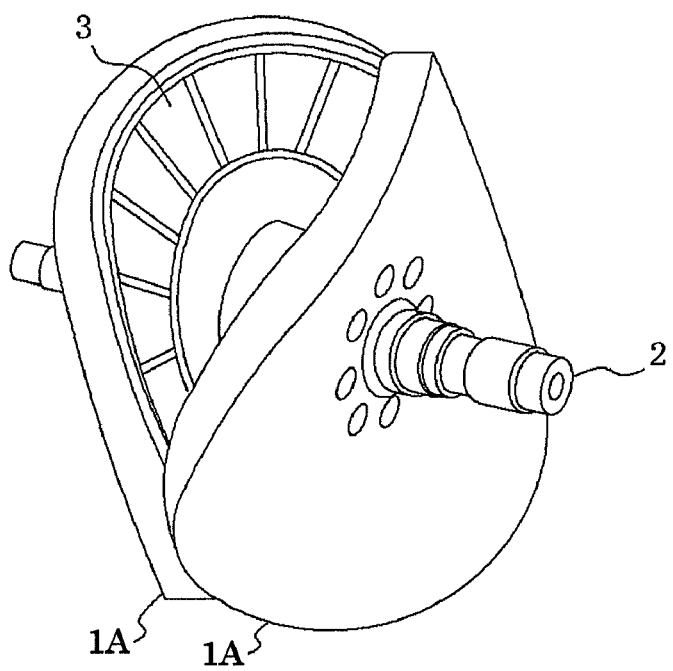
FIG. 3 is a simplified perspective view illustrating a planar mode of vibration in the axial gap type motor/generator illustrated in FIG. 1.

With the axial gap type motor/generator, a planar mode of vibration occurs in which the rotor parts 1A deform along the direction of the center rotational axis O. At certain rotational speeds of the rotor parts 1A, this planar mode of vibration becomes prominent and a planar mode of resonance occurs. If, for example, the axial gap motor/generator is an 18-slot, 20-pole type having 18 stator iron cores 8 and 20 permanent magnets 3 arranged circumferentially, then the order number of the planar mode of vibration will be two (second order), which is equal to the difference between the number of slots and the number of permanent magnets 3. The second order planar mode of vibration is shown in FIG. 3. As shown in FIG. 3, is the rotor parts 1A are deformed into a saddle-like shape. As the torque of the motor/generator becomes higher, the greater the deformation of the rotor parts 1A becomes due to the low-order planar mode of vibration.

If the axial gap motor/generator has S slots and P poles, then the resonance will be the |P−S| order of the planar mode vibration. The rotational speed (e.g., revolutions per minute) at which the rotor parts 1A resonate varies depending on the size and dimensions of the axial gap motor/generator.

It is preferable for the number of slots S and the number of poles P to be close to each other in order to improve the torque density of the motor and to improve the motor efficiency. However, when the difference |P−S| is small, a low order planar mode resonance like that shown in FIG. 3 becomes a problem because a sufficient air gap 4 cannot be secured if the deformation resulting from the planar mode resonance is large.

Figure 4:
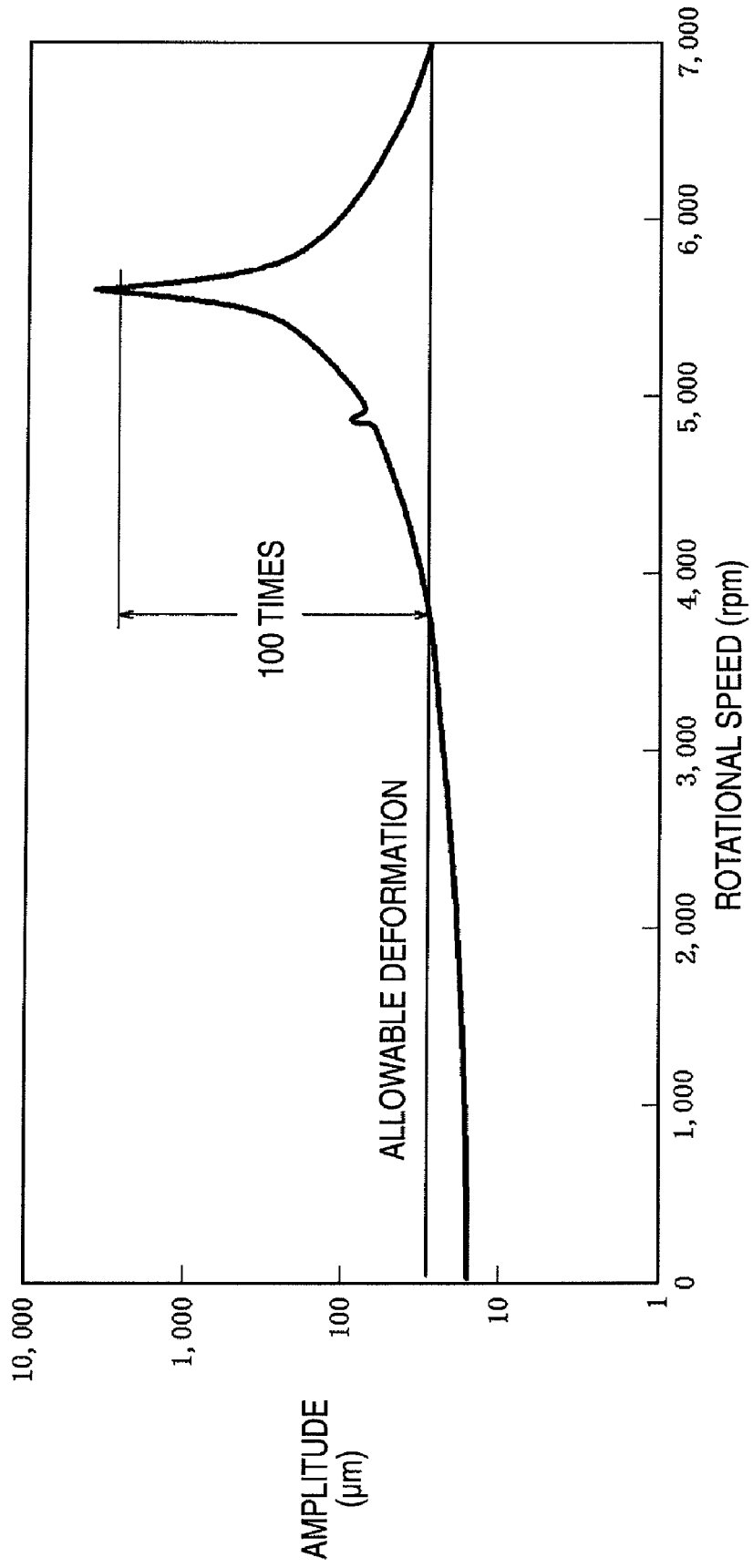
FIG. 4 is a graph plotting the deformation amount resulting from (amplitude of) planar mode vibration versus the rotor rotational speed.
Figure 5:
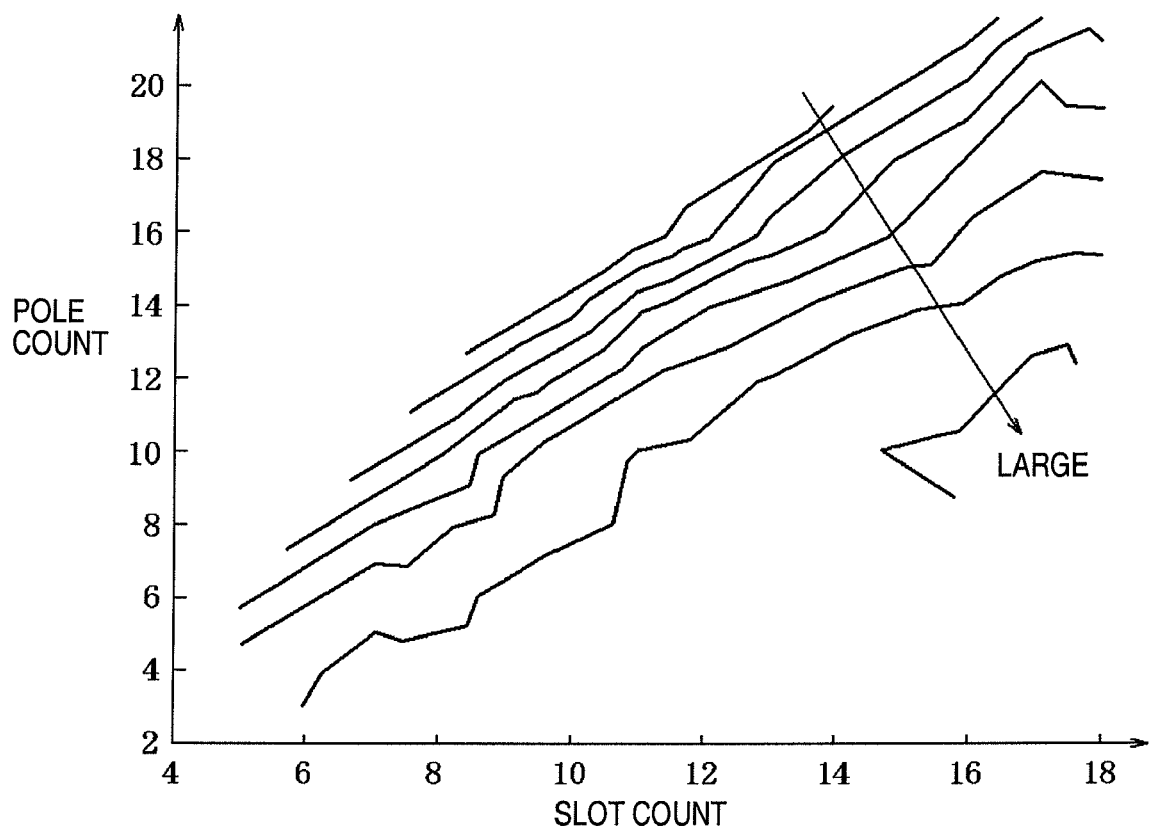
FIG. 5 is a map for determining a coefficient of a first order frequency component used in an alternating current control.
Figure 6:
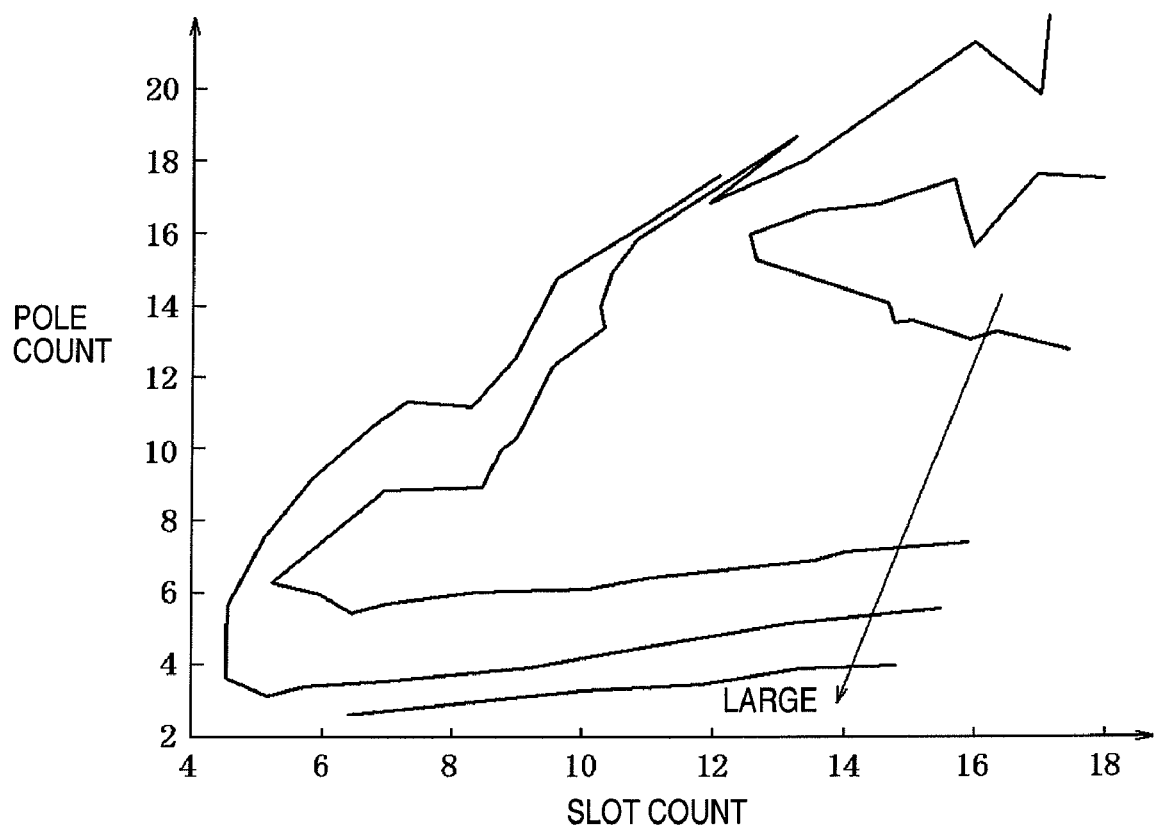
FIG. 6 is a map for determining a coefficient of a first order frequency component used in an alternating current control.
Figure 7:
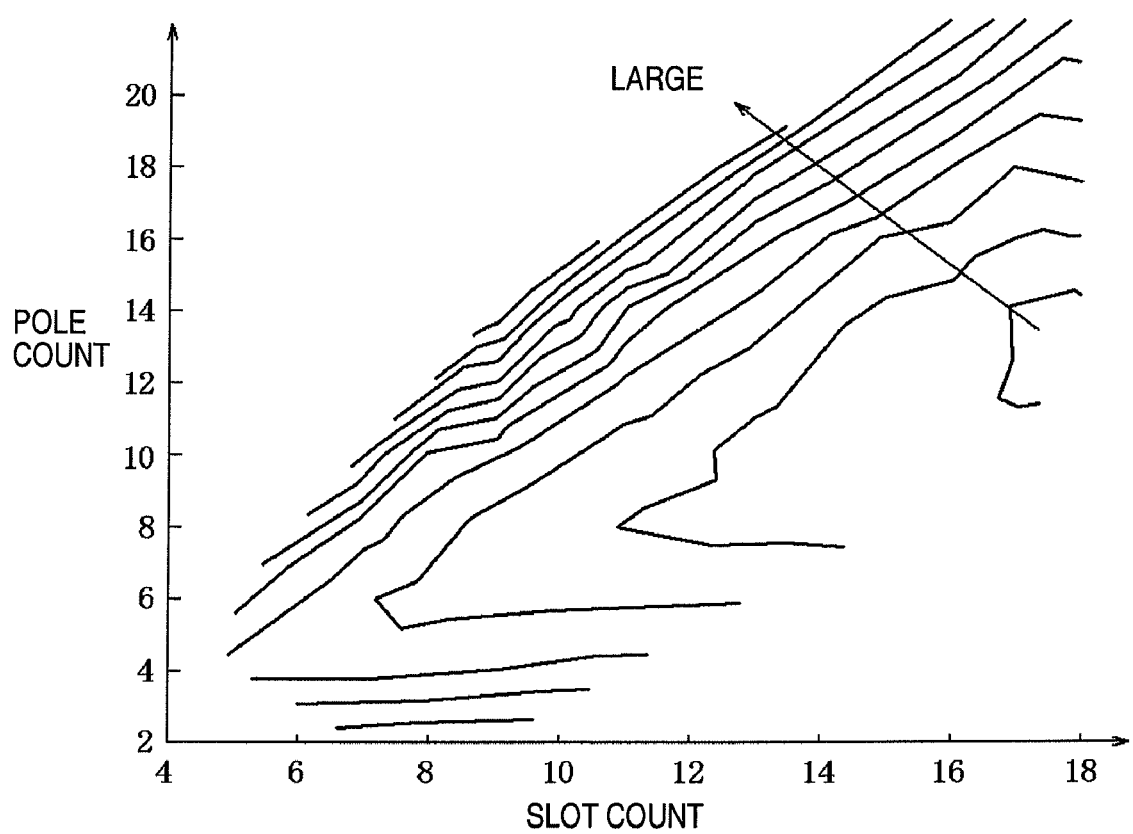
FIG. 7 is a map for determining a coefficient of a third order frequency component used in an alternating current control.
Figure 8:
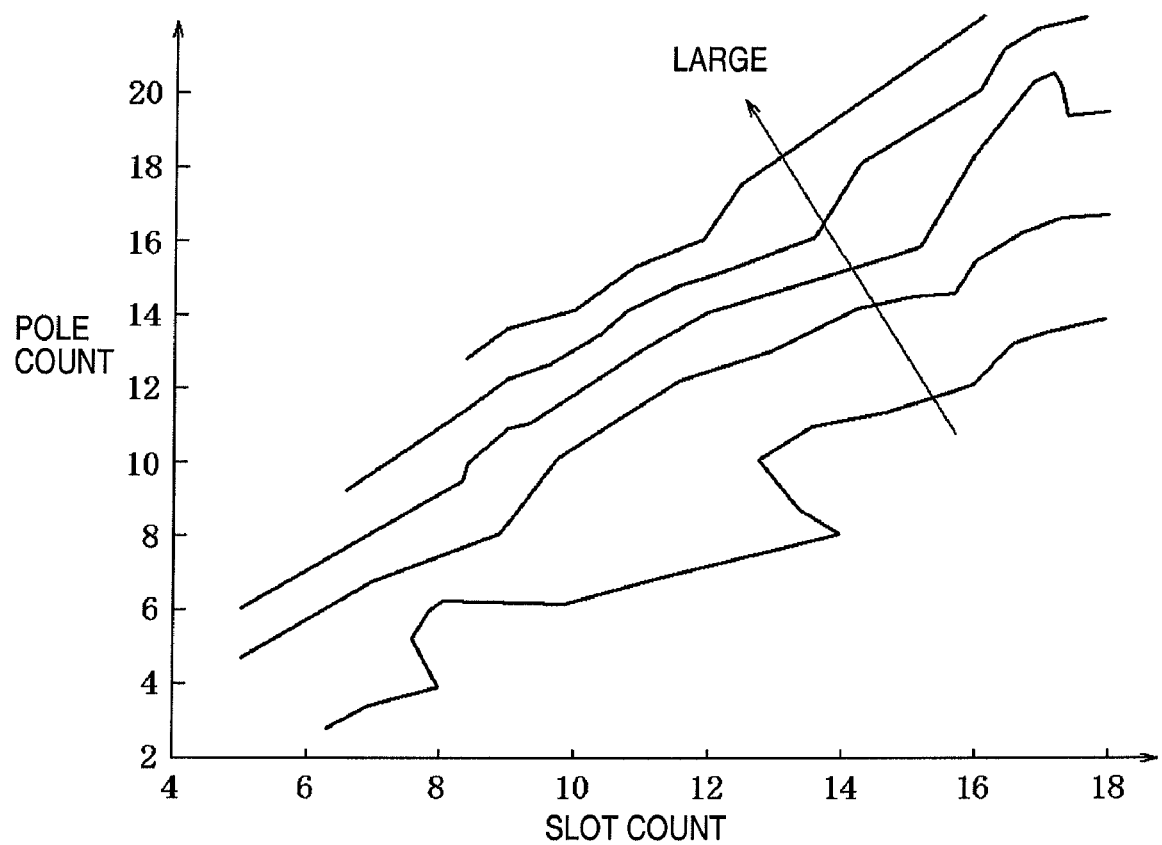
FIG. 8 is a map for determining a coefficient of a third order frequency component used in an alternating current control.
Figure 9:
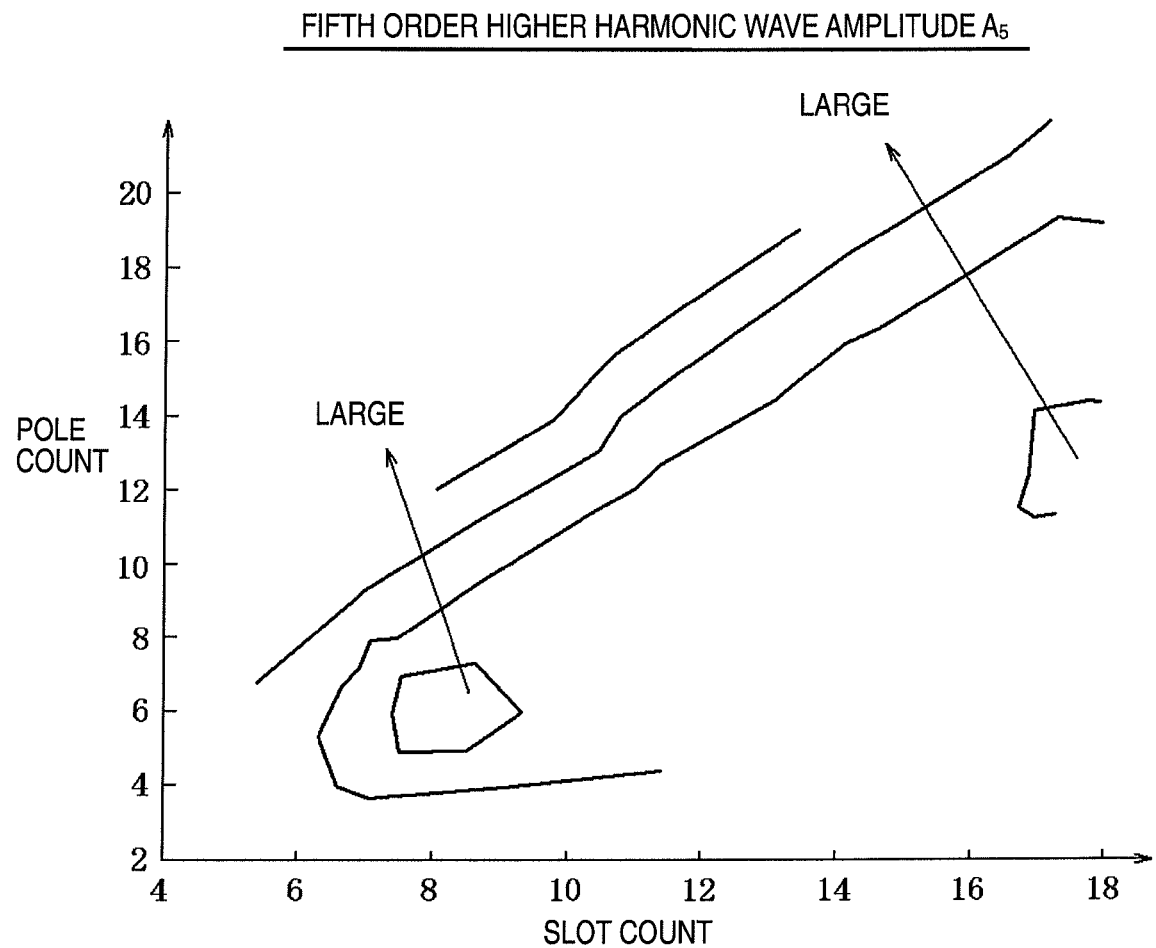
FIG. 9 is a map for determining a coefficient of a fifth order frequency component used in an alternating current control.
Figure 10:
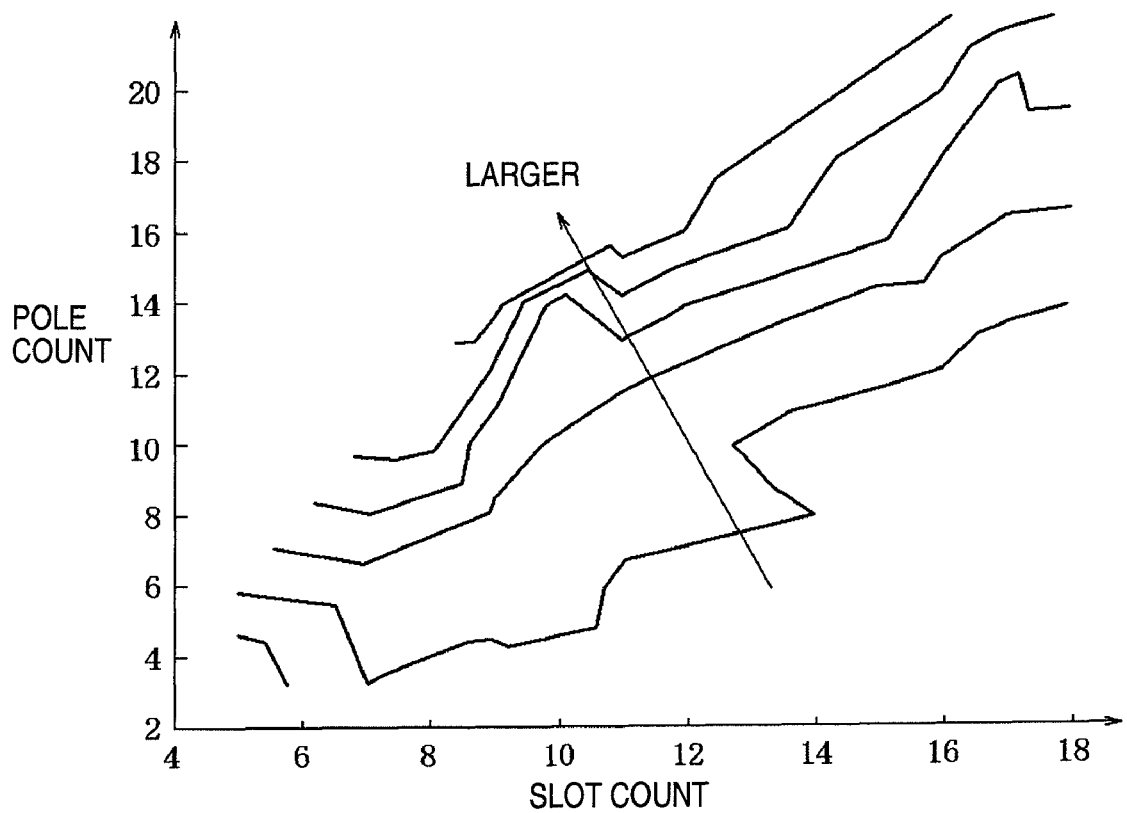
FIG. 10 is a map for determining a coefficient of a fifth order frequency component used in an alternating current control.

FIG. 4 shows an example of a plot of the amplitude (equal to deformation amount of the rotor 1) of the planar mode of vibration versus the rotational speed (rpm) for a motor/generator according to this embodiment. As indicated with the bold-line curve, the deformation amount of the rotor 1 exceeds an allowable deformation limit amount of deformation (indicated with a thin-line) by 100 times at a rotor rotational speed of 5600 rpm.

In order to keep the deformation amount of the rotor 1, i.e., the amplitude of the planar mode resonance, from exceeding the allowable deformation limit amount, an alternating current control is executed which is configured to produce an alternating current in the coils 9 that includes a plurality of superpositioned frequency components that include a first order fundamental wave component and a plurality of higher harmonic wave components that have frequencies equal to integer multiples of the frequency of the fundamental wave component and are of orders that are equal to the values of the integer multiples. The alternating current control is further configured to control a relationship among the frequency components such that two pairs of frequency components whose orders differ by 2 are aligned with each other.

In this embodiment, the alternating current control just described is executed when the rotational speed is in the vicinity of 5600 rpm, which is where the planar mode resonance occurs. More specifically, as shown in FIG. 4, the alternating current control is executed when the rotational speed is in a region ranging from approximately 3900 rpm to 7000 rpm, in which region the deformation amount, i.e., the amplitude of the planar mode resonance, exceeds the allowable deformation limit amount.

FIRST EXAMPLE

A first example in which an alternating current control will now be explained in which the axial gap type motor generator is configured basically as shown in FIG. 1 as a seven-phase motor/generator having 18 slots and 20 poles.

In the first example, the alternating current control produces a multiple-phase alternating current I(t) in the coils 9 by superpositioning a sinusoidal fundamental wave component, a third order higher harmonic wave (frequency) component having a frequency three times larger than the frequency of the fundamental wave component, and a fifth order higher harmonic wave (frequency) component having a frequency five times larger than the frequency of the fundamental wave component. Each of these components is an nth order higher harmonic wave (frequency) component having a frequency equal to n times the frequency of the fundamental wave component (where n is an integer). When expressed as an equation, the current is as follows.

$$I(t) = A1 \times \sin(\omega t + \beta 1) + A3 \times \sin(3\omega t + \beta 3) + A5 \times \sin(5\omega t + \beta 5) \quad (1)$$

In the equation, t is time, ω is angular velocity, A1 is a coefficient determining the amplitude of the fundamental wave component, B1 is a coefficient determining the phase of the fundamental wave component, A3 is coefficient determining the amplitude of the third order higher harmonic wave component, B3 is a coefficient determining the phase the third order higher harmonic wave component, A5 is coefficient determining the amplitude of the fifth order higher harmonic wave component, and B5 is a coefficient determining the phase the fifth order higher harmonic wave component.

In the first example, the multiple-phase alternating current I(t) fed to the coils 9 is produced by superpositioning the first order fundament wave component, the third order higher harmonic wave component, and the fifth order higher harmonic wave component, and a relationship among the first, third, and fifth order frequency components is controlled such that that a pair of frequency components comprising the first order frequency component and the third order frequency component (whose orders differ by 2) and a pair of frequency components comprising the third order frequency component and the fifth order frequency component (whose orders differ by 2) are aligned with each other.

Thus, with the first example, a low order planar vibrational resonance can be eliminated or reduced because the current is controlled such that two pairs of frequency components whose orders differ by 2 are aligned with each other.

The coefficients A1, β1, A3, β3, A5, and β5 will now be explained. FIGS. 5 to 10 are maps used for determining the values of the coefficients in the case of an axial gap type motor/generator having a number of slots (slot count) S (also equal to the number of stator iron cores 8) and a number of poles (pole count) P. In each of the maps, the number of slots is indicted on a horizontal axis and the number of poles is indicated on a vertical axis. The slot count is equal to the number of stator iron cores 8 shown in FIG. 1.

The alternating current control device 10 executes the alternating current control to regulate the alternating current flowing in the coils 9 control by referring to the maps shown in FIGS. 5 to 10 to determine values of the coefficients A1, β1, A3, β3, A5 and β5, respectively, that will achieve an effect of reducing the planar mode of vibration to at least a prescribed degree. These maps are obtained by experimentation or computer simulation. When the coefficients A1, β1, A3, β3, A5 and β5 have been determined, an effect of reducing the deformation caused by (i.e., reducing the amplitude of) the planar mode vibration to at least a prescribed degree (e.g., by a factor of 100) is obtained. When a size/dimension of the axial gap type motor/generator is changed, it is necessary to prepare these maps again by experimentation or computer simulation.

Figure 11:
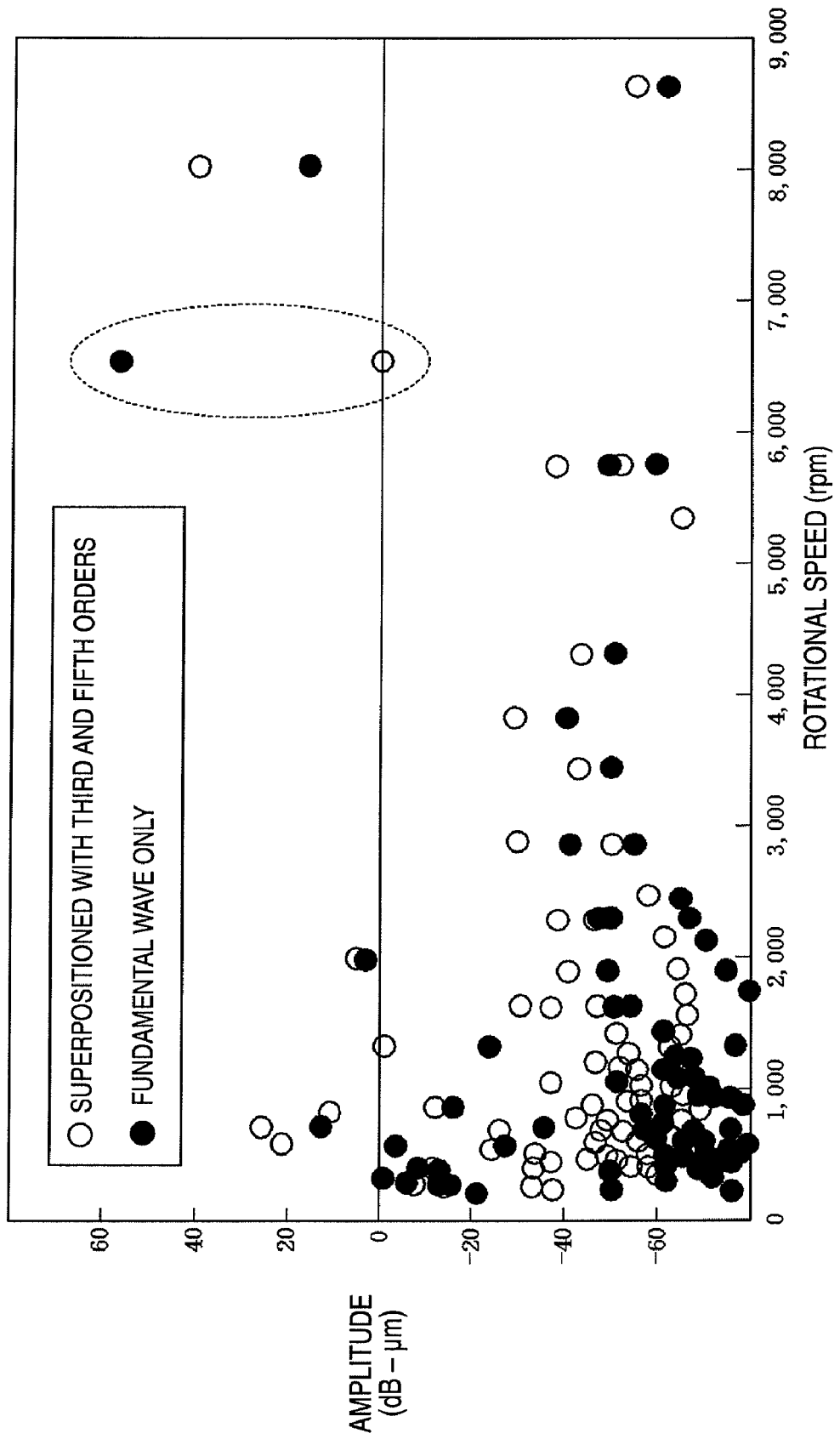
FIG. 11 illustrates the effect of reducing the deformation resulting from (i.e. the amplitude of) the planar mode vibration achieved with the same alternating current control.

FIG. 11 illustrates the effect of reducing the deformation resulting from planar mode vibration (i.e., reducing the amplitude) that is obtained with an axial gap type motor/generator in accordance with the first example. The horizontal axis indicates the rotational speed of the rotor parts 1A and the vertical axis indicates the deformation amount (amplitude). In FIG. 11, deformations amounts (amplitudes) that result when the alternating current is produced with only the first order fundamental component are indicated with solid black dots. Conversely, deformations amounts (amplitudes) that result when the alternating current is produced with the first order fundamental component, the third order higher harmonic wave component, and the fifth order higher harmonic wave component are indicated with white dots. FIG. 11 shows a large number of experimental data, each comprising a pair of dots (one black, one white) corresponding to the same rotational speed. The results for the rotor rotational speed 6600 rpm are enclosed in a broken-line circle in FIG. 11 and illustrate where the first example reduces the planar mode vibration in the most effective manner.

With the alternating current control of the first example, the deformation amount (amplitude) can be reduced in an effective manner in the vicinity of the rotor rotational speed (5900 rpm) at which planar mode resonance occurs.

More preferably, the radius and axial thickness of the rotor parts 1A is selected appropriately and the size and dimensions of the axial gap type motor generator are designed such that the rotor rotational speed at which planar mode resonance occurs is in a lower rotational speed region that lies on a low side of a rotational speed region in which the motor/generator is normally used. In this way, the higher harmonic frequencies can be lowered and controlled more easily.

Figure 12:
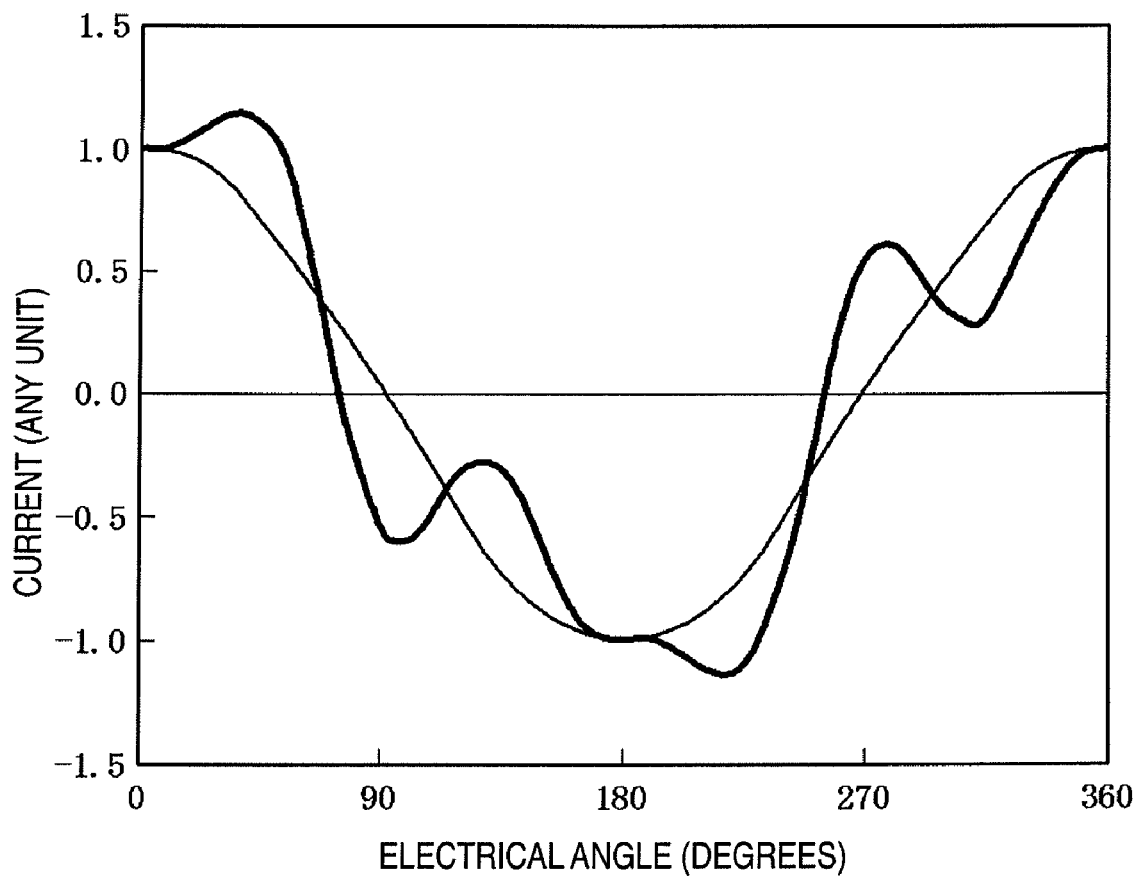
FIG. 12 illustrates a waveform of an alternating current produced with the same alternating current control.

FIG. 12 shows a waveform of an alternating current produced with an alternating current control based on the equation (1). In FIG. 12, the electrical angle is indicated on the horizontal axis and the current is indicated on the vertical axis. In FIG. 12, the thin-line indicates the first order fundamental wave component and the bold-line indicates a multiple-phase alternating current of the coils 9 obtained by superpositioning the first order fundamental component, the third order higher harmonic wave component, and the fifth order higher harmonic wave component.

SECOND EXAMPLE

A second example in which an alternating current control will now be explained in which the axial gap type motor generator is configured basically as shown in FIG. 1 as a three-phase motor/generator having 18 slots and 20 poles.

In the second example, the alternating current control produces a multiple-phase alternating current to be fed to the coils 9 by superpositioning a sinusoidal fundamental wave (frequency) component, a fifth order higher harmonic wave (frequency) component having a frequency five times larger than the frequency of the fundamental wave component, a seventh order higher harmonic wave (frequency) component having a frequency five times larger than the frequency of the fundamental wave component, an eleventh order higher harmonic wave (frequency) component having a frequency eleven times larger than the frequency of the fundamental wave component, and a thirteenth order higher harmonic wave component having a frequency thirteen times larger than the frequency of the fundamental wave component.

In the second example, the multiple-phase alternating current I(t) fed to the coils 9 is produced by superpositioning the first order fundament wave component, the fifth order higher harmonic wave component, the seventh order higher harmonic wave component, the eleventh order higher harmonic wave component, and the thirteenth order higher harmonic wave component and a relationship among the first, fifth, seventh, eleventh, and thirteenth order frequency components is controlled such that that a pair of frequency components comprising the fifth order frequency component and the seventh order frequency component (whose orders differ by 2) and a pair of frequency components comprising the eleventh order frequency component and the thirteenth order frequency component (whose orders differ by 2) are aligned with each other.

Thus, with the second example, a low order planar vibrational resonance can be eliminated or reduced because the current is controlled such that two pairs of frequency components whose orders differ by 2 are aligned with each other.

The coefficients for the different frequency components should be set such that the deformation resulting from the planar mode vibration (i.e., the amplitude of the planar mode vibration) is reduced to at least a prescribed degree (e.g., by a factor of 100).

In addition to a three-phase AC motor/generator having 18 slots and 20 poles, the alternating current control of the second example can also be applied to an axial gap type motor/generator uses a single-phase alternating current or a multiple-phase current having frequency components other than frequencies equal to 5, 7, 11, and 13 times the fundamental frequency.

The alternating current controls presented in the first and second examples disclose the results of research conducted to discover combinations of higher harmonic wave components that reduce planar mode vibration in an effective manner. More specifically, it was discovered that a unique effect of eliminating or appropriately reducing the planar modes of vibration described above can be obtained by sending alternating current to the coil of a synchronous motor/generator where the alternating current has two superpositioned pairs of frequency components whose orders differ by 2 (i.e., the orders of the frequency components of each pair differ by 2).

Both the first and second examples relate to an alternating current control apparatus for an axial gap type motor/generator (FIGS. 1 to 3) comprising a comprising a stator 6 having a plurality of circumferentially arranged stator iron cores 8 onto which a coil 9 is wound and a rotor 1 that has a plurality of magnetic poles and is arranged facing the stator 6 along the direction of a center rotational axis O. The alternating current control apparatus controls a single phase or a multiple phase alternating current flowing in the coil 9 of the axial gap type motor/generator. More specifically, the alternating current control apparatus produces the single phase or multiple phase alternating current by superpositioning a plurality of frequency components, the plurality of frequency components comprising a first order fundamental wave and a plurality of higher harmonic wave components that have frequencies equal to integer multiples of the frequency of the fundamental wave component and are of orders that are equal to the values of the integer multiples. By stipulating a relationship among the frequency components such that two pairs of frequency components whose orders differ by 2 are aligned with each other, planar mode vibration of the rotor can be eliminated or appropriately reduced.

As a result, the planar mode of vibration can be eliminated or reduced in an effective manner even if the axial gap type motor/generator has a large number of poles and the difference between the number of slots and the number of poles is small. In addition to the second order planar mode vibration shown in FIG. 3, fourth and higher orders of planar mode vibration can also be eliminated.

More specifically, in the first example, the higher harmonic wave components are the third order and fifth order components. Thus, the alternating current control can be accomplished easily because the higher harmonic wave components used are lower order harmonics. The alternating current control can also be accomplished more easily because there are only two higher harmonic wave components. In addition to a seven-phase AC motor/generator having 18 slots and 20 poles, the alternating current control can also be applied to an axial gap type motor/generator configured to use a single-phase alternating current or a multiple-phase current having frequency components other than frequencies equal to 3 and 5 times the fundamental frequency. Furthermore, the alternating current control is not limited to eliminating second order planar mode vibration (see FIG. 3) when the difference between the number of slots (e.g., 18) and the number of poles (e.g., 20) is 2. Instead, the alternating current control can eliminate fourth order or higher order planar deformation when the difference between the number of slots and the number of poles is 4 or higher.

Still more specifically, the alternating current I(t) fed to the coils 9 is controlled by the equation (1). The coefficients A1 and β1, the coefficients A3 and β3, and the coefficients A5 and β5 are set such that an effect of reducing an order of a planar mode vibration of the rotor 1 is achieved to a prescribed degree, the planar vibration being a vibration involving deformation of the rotor 1 oriented along the direction of the center rotational axis O and the order of the planar vibration being equal to a difference between the number of stator iron cores 8 (slot count) and the number of magnetic poles of the rotor 1. Thus, as indicating in FIGS. 5 to 10, a current control in accordance with this embodiment can be applied to axial gap type motor/generators having a variety of slot counts and pole counts.

Meanwhile, in the second example, the higher harmonic wave components are the fifth, seventh, eleventh, and thirteenth order components. Thus, planar mode vibrations can be eliminated or reduced in a three-phase motor/generator by using lower-order higher harmonic wave components. Furthermore, with the second example, the alternating current control is not limited to eliminating second order planar mode vibration (see FIG. 3) when the difference between the number of slots (e.g., 18) and the number of poles (c.g., 20) is 2. Instead, the alternating current control can eliminate fourth order or higher order planar deformation when the difference between the number of slots and the number of poles is 4 or higher.

It is preferable for the alternating current control according to the first and second examples to be executed when the rotational speed of the rotor 1 is in the vicinity of a rotational speed, among rotational speeds at which the rotor 1 resonates, at which the rotor 1 undergoes a planar resonance in which the rotor 1 deforms in a rotor axial direction. As a result, planar mode vibration can be eliminated or reduced as appropriate in accordance with the operating state of the axial gap type motor/generator.

Still more preferably, the radius and the thickness along the direction of the center rotational axis O of the rotor 1 should be selected and the size/dimensions of the axial gap type motor/generator should be designed such that the rotor rotational speed at which the rotor undergoes a planar mode of resonance is in a low rotational speed region that lies on a low side of a prescribed operating rotational speed region in which the axial gap type motor/generator is normally used. In this way, the occurrence of planar mode vibration can be suppressed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. Thus, the foregoing descriptions of the embodiments according to the present invention are provided for illustration only, and not for the purpose of limiting the invention as defined by the appended claims and their equivalents.

What is claimed is:
1. An axial gap type motor/generator comprising:
   a stator including a plurality of stator iron cores with a coil disposed on each of the stator iron cores;
   a rotor facing the stator, with the rotor including a plurality of magnetic poles; and
   an alternating current control device configured to execute alternating current control of a single phase or multiple phase alternating current flowing in the coils,
   the alternating current control device including
      a superpositioning control section configured to produce the alternating current by superpositioning a plurality of frequency components including a first order fundamental wave component and a plurality of higher harmonic wave components that have frequencies equal to integer multiples of a frequency of the fundamental wave components and are of orders that are equal to values of the integer multiples; and a frequency component control section configured to control a relationship among the frequency components such that two pairs of the frequency components whose orders differ by two are aligned with respect to each other.

2. The axial gap type motor/generator as recited in claim 1, wherein
the frequency component control section is further configured to control a third order frequency component and a fifth order frequency component as the higher harmonic wave components.

3. The axial gap type motor/generator as recited in claim 2, wherein
the superpositioning control section produces the alternating current as follows:

$$I(t)=A1\times\sin(\omega t+\beta 1)+A3\times\sin(3\omega t+\beta 3)+A5\times\sin(5\omega t+\beta 5)$$

where t is time,
$\omega$ is angular velocity,
A1 and B1 are coefficients for the fundamental wave component,
A3 and B3 are coefficients for the third order frequency component, and
A5 and B5 are coefficients for the fifth order frequency component; and
the frequency component control section is further configured to set the coefficients to values that reduce an order of a planar mode of vibration of the rotor to approach a prescribed degree, in which the order is equal to a difference between a number of the stator iron cores and a number of the magnetic poles of the rotor, and the planar mode of vibration is a vibration involving deformation of the rotor in an axial direction.

4. The axial gap type motor/generator as recited in claim 1, wherein
the frequency component control section is further configured to control a fifth order frequency component, a seventh order frequency component, an eleventh order frequency component, and a thirteenth order frequency component as the higher harmonic wave components.

5. The axial gap type motor/generator as recited in claim 1, wherein
the alternating current control device is further configured to execute the alternating current control when a rotational speed of the rotor is in a vicinity of a rotational speed at which the rotor undergoes a planar mode of resonance resulting in the rotor deforming in a rotor axial direction.

6. The axial gap type motor/generator as recited in claim 5, wherein
the rotor and the stator are dimensioned such that the rotor rotational speed at which the rotor undergoes the planar mode of resonance is in a low rotational speed region that lies on a low rotational speed side of a prescribed operating rotational speed region in which the axial gap type motor/generator is normally used.

7. The axial gap type motor/generator as recited in claim 2, wherein
the alternating current control device is further configured to execute the alternating current control when a rotational speed of the rotor is in a vicinity of a rotational speed at which the rotor undergoes a planar mode of resonance resulting in the rotor deforming in a rotor axial direction.

8. The axial gap type motor/generator as recited in claim 3, wherein
the alternating current control device is further configured to execute the alternating current control when a rotational speed of the rotor is in a vicinity of a rotational speed at which the rotor undergoes a planar mode of resonance resulting in the rotor deforming in a rotor axial direction.

9. The axial gap type motor/generator as recited in claim 4, wherein
the alternating current control device is further configured to execute the alternating current control when a rotational speed of the rotor is in a vicinity of a rotational speed at which the rotor undergoes a planar mode of resonance resulting in the rotor deforming in a rotor axial direction.

10. An axial gap type motor/generator comprising:
stator means for receiving alternating current;
magnetic rotor means for rotating relative to the stator means; and
alternating current control means for executing alternating current control of the alternating current flowing in the stator means to produce the alternating current by superpositioning a plurality of frequency components including a first order fundamental wave component and a plurality of higher harmonic wave components that have frequencies equal to integer multiples of a frequency of the fundamental wave components and are of orders that are equal to values of the integer multiples, and to control a relationship among the frequency components such that two pairs of the frequency components whose orders differ by two are aligned with respect to each other.

11. A method of controlling an axial gap type motor/generator having a stator including a plurality of stator iron cores with a coil disposed on each of the stator iron cores and a rotor facing the stator, with the rotor including a plurality of magnetic poles, the method comprising:
producing alternating current in coils of the stator by superpositioning a plurality of frequency components including a first order fundamental wave component and a plurality of higher harmonic wave components that have frequencies equal to integer multiples of a frequency of the fundamental wave components and are of orders that are equal to values of the integer multiples, and
control a relationship among the frequency components such that two pairs of the frequency components whose orders differ by two are aligned with respect to each other.

12. The axial gap type motor/generator as recited in claim 1, wherein
the frequency component control section is further configured to set amplitudes and phases of the two pairs of the frequency components in accordance with a number of the stator iron cores and a number of the magnetic poles of the rotor, and a planar mode of vibration of the rotor is a vibration involving deformation of the rotor in an axial direction.

13. The axial gap type motor/generator as recited in claim 10, wherein
the alternating current control means produces the alternating current as follows:

$$I(t)=A1\times\sin(\omega t+\beta 1)+A3\times\sin(3\omega t+\beta 3)+A5\times\sin(5\omega t+\beta 5)$$

where t is time,
$\omega$ is angular velocity,
A1 and B1 are coefficients for the fundamental wave component,
A3 and B3 are coefficients for the third order frequency component, and
A5 and B5 are coefficients for the fifth order frequency component; and
the alternating current control means is further configured to set the coefficients to values that reduce an order of a planar mode of vibration of the magnetic rotor means to approach a prescribed degree, in which the order is equal to a difference between a number of stator iron cores in the stator means and a number of magnetic poles of the magnetic rotor means, and the planar mode of vibration is a vibration involving deformation of the magnetic rotor means in an axial direction.

14. The axial gap type motor/generator as recited in claim 13, wherein
the alternating current control means is further configured to execute the alternating current control when a rotational speed of the magnetic rotor means is in a vicinity of a rotational speed at which the magnetic rotor means undergoes a planar mode of resonance resulting in the magnetic rotor means deforming in a rotor axial direction.

15. The axial gap type motor/generator as recited in claim 10, wherein
the alternating current control means is further configured to control a fifth order frequency component, a seventh order frequency component, an eleventh order frequency component, and a thirteenth order frequency component as the higher harmonic wave components.

16. The axial gap type motor/generator as recited in claim 15, wherein
the alternating current control means is further configured to execute the alternating current control when a rotational speed of the magnetic rotor means is in a vicinity of a rotational speed at which the magnetic rotor means undergoes a planar mode of resonance resulting in the magnetic rotor means deforming in a rotor axial direction.

17. The axial gap type motor/generator as recited in claim 10, wherein
the alternating current control means is further configured to execute the alternating current control when a rotational speed of the magnetic rotor means is in a vicinity of a rotational speed at which the magnetic rotor means undergoes a planar mode of resonance resulting in the magnetic rotor means deforming in a rotor axial direction; and
the magnetic rotor means and the stator means are dimensioned such that the rotational speed at which the magnetic rotor means undergoes the planar mode of resonance is in a low rotational speed region that lies on a low rotational speed side of a prescribed operating rotational speed region in which the axial gap type motor/generator is normally used.

18. The axial gap type motor/generator as recited in claim 10, wherein
the alternating current control means is further configured to set amplitudes and phases of the two pairs of the frequency components in accordance with a number of stator iron cores in the stator means and a number of magnetic poles of the magnetic rotor means, and a planar mode of vibration of the magnetic rotor means is a vibration involving deformation of the magnetic rotor means in an axial direction.

19. The method as recited in claim 11, wherein
the alternating current producing produces the alternating current as follows:

$$I(t) = A1 \times \sin(\omega t + \beta 1) + A3 \times \sin(3\omega t + \beta 3) + A5 \times \sin(5\omega t + \beta 5)$$

where t is time,
$\omega$ is angular velocity,
A1 and B1 are coefficients for the fundamental wave component,
A3 and B3 are coefficients for the third order frequency component, and
A5 and B5 are coefficients for the fifth order frequency component; and
the control further sets the coefficients to values that reduce an order of a planar mode of vibration of the rotor to approach a prescribed degree, in which the order is equal to a difference between a number of the stator iron cores and a number of the magnetic poles, and the planar mode is a vibration involving deformation of the rotor in an axial direction.

20. The method as recited in claim 19, wherein
the control is executed when a rotational speed of the rotor is in a vicinity of a rotational speed at which the rotor undergoes a planar mode of resonance resulting in the rotor deforming in a rotor axial direction.

21. The method as recited in claim 11, wherein
the control further controls a fifth order frequency component, a seventh order frequency component, an eleventh order frequency component, and a thirteenth order frequency component as the higher harmonic wave components.

22. The method as recited in claim 21, wherein
the control is executed when a rotational speed of the rotor is in a vicinity of a rotational speed at which the rotor undergoes a planar mode of resonance resulting in the rotor deforming in a rotor axial direction.

23. The method as recited in claim 11, wherein
the control is executed when a rotational speed of the rotor is in a vicinity of a rotational speed at which the rotor undergoes a planar mode of resonance resulting in the rotor deforming in a rotor axial direction; and
the rotor and the stator are dimensioned such that the rotational speed at which the rotor undergoes the planar mode of resonance is in a low rotational speed region that lies on a low rotational speed side of a prescribed operating rotational speed region in which the axial gap type motor/generator is normally used.

24. The method as recited in claim 11, wherein
the control further sets amplitudes and phases of the two pairs of the frequency components in accordance with a number of the stator iron cores and a number of the magnetic poles, and a planar mode of vibration of the rotor is a vibration involving deformation of the rotor in an axial direction.

* * * * *